(12) United States Patent
Masterson et al.

(10) Patent No.: US 6,665,745 B1
(45) Date of Patent: Dec. 16, 2003

(54) METHOD AND SYSTEM FOR PERIPHERAL ORDERING

(75) Inventors: Scott Masterson, Wichita, KS (US); Russell J. Henry, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 557 days.

(21) Appl. No.: 09/632,901

(22) Filed: Aug. 4, 2000

(51) Int. Cl.[7] .................................................. G06F 3/00
(52) U.S. Cl. ........................... 710/17; 710/36; 710/129; 709/229; 712/29
(58) Field of Search ............................ 710/8, 9, 12, 17, 710/18, 36, 62, 64, 72–74, 129; 712/225, 29; 370/409; 709/229

(56) References Cited

U.S. PATENT DOCUMENTS

| | | | | |
|---|---|---|---|---|
| 5,463,766 A | * | 10/1995 | Schieve et al. ............. 395/650 |
| 5,701,514 A | * | 12/1997 | Keener et al. ................. 710/4 |
| 6,055,372 A | * | 4/2000 | Kardach et al. ............ 710/216 |
| 6,108,697 A | * | 8/2000 | Raymond et al. ........... 709/218 |
| 6,144,672 A | * | 11/2000 | Brauner ....................... 370/409 |
| 6,385,707 B1 | * | 5/2002 | Maffezzoni ................. 711/162 |
| 6,493,722 B1 | * | 12/2002 | Daleen et al. ............ 707/104.1 |

* cited by examiner

Primary Examiner—Jeffrey Gaffin
Assistant Examiner—RiJue Mai
(74) Attorney, Agent, or Firm—Suiter-West PC LLO

(57) ABSTRACT

The present invention is directed to a system and method of retaining peripheral ordering. A method for retaining peripheral ordering in an information handling system may include reading an ordered peripheral list (OPL) from a nonvolatile memory. A list of active peripherals attached to an I/O interface controller is obtained. An order of peripherals from the ordered peripheral list (OPL) is identified and assignments are assigned to the active peripherals attached to the I/O interface controller corresponding to the ordered peripheral list (OPL).

5 Claims, 4 Drawing Sheets

METHOD AND SYSTEM FOR PERIPHERAL ORDERING

FIELD OF THE INVENTION

The present invention generally relates to the field of information handling system, and particularly to a method and system for peripheral ordering.

BACKGROUND OF THE INVENTION

Operating system architectures typically require the use of a boot and system disk drive to store files needed during initialization. The boot and system drives are identified by the operating system by the respective order in a list of peripherals available. Typically, the boot drive is the first drive and the system drive may be any other drive but must maintain its order in the list. The list of available peripherals is created by and provided to the operating system by the I/O interface controller. The I/O interface controller must make sure the boot and system drive remains in the same location in the list.

Typically, I/O architectures allow a user to assign a specific identification number to a peripheral. Thus, it is up to the user to make sure that the list of available peripherals is ordered correctly based on the specific I/O interface controller used and the order of IDs assigned. For example, a small computer system interface (SCSI) controller orders its peripherals from lowest to highest based on the SCSI ID. Thus, it is the responsibility of the user to make sure that the boot and system drive ID remains constant. In another example, a fibre channel (FC) controller orders its peripherals from lowest to highest based on the arbitrated loop peripheral address (ALPA) automatically assigned to each peripheral during loop initialization. Therefore, it is again the user's responsibility to make sure that the boot and system drive remains in the same location in the list of available peripherals. Since these ID's are assigned automatically by the hardware loop initialization the user has no way of maintaining the ordering of the peripherals.

Additionally, the lack of the ability to retain peripheral ordering has limited the advancement of ID assignment. For example, SCSI configured auto-magically (SCAM) is a method to allow SCSI peripherals to be identified automatically. Although this ID assignment method did assign ID's automatically it was not accepted in the industry because there was no available method for constant ordering of the peripherals when a new device was added. Thus, SCAM was not accepted as a valid method for automatic ID assignment for SCSI.

Thus, it would be desirable to provide a system and method of retaining peripheral ordering.

SUMMARY OF THE INVENTION

Accordingly, the present invention is directed to a system and method of retaining peripheral ordering. In a first aspect of the present invention, a method for retaining peripheral ordering in an information handling system includes reading an ordered peripheral list (OPL) from a nonvolatile memory. A list of active peripherals attached to an I/O interface controller is obtained. An order of peripherals from the ordered peripheral list (OPL) is identified and assignments are assigned to the active peripherals attached to the I/O interface controller corresponding to the ordered peripheral list (OPL).

In a second aspect of the present invention, a device suitable for retaining peripheral ordering includes an I/O interface controller suitable for controlling an I/O interface and a nonvolatile memory including an ordered peripheral list. The ordered peripheral list is suitable for supplying an order of peripherals to an I/O interface controller such that active peripherals that are identified are capable of receiving an assignment corresponding to the ordered peripheral list (OPL), thus allowing at least one of a system drive and boot drive to remain in a specific place in the list of active peripherals upon rebooting.

In a third aspect of the present invention, a method for retaining peripheral ordering in an information handling system includes booting an information handling system and executing a basic input/output system (BIOS) included on the information handling system. An ordered peripheral list (OPL) stored in a nonvolatile memory is read by the BIOS and a list of active peripherals coupled to an I/O interface controller is obtained. An order of peripherals is identified wherein the list of active peripherals is compared to the ordered peripheral list (OPL). Assignments are given to the active peripherals corresponding to the ordered peripheral list (OPL).

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
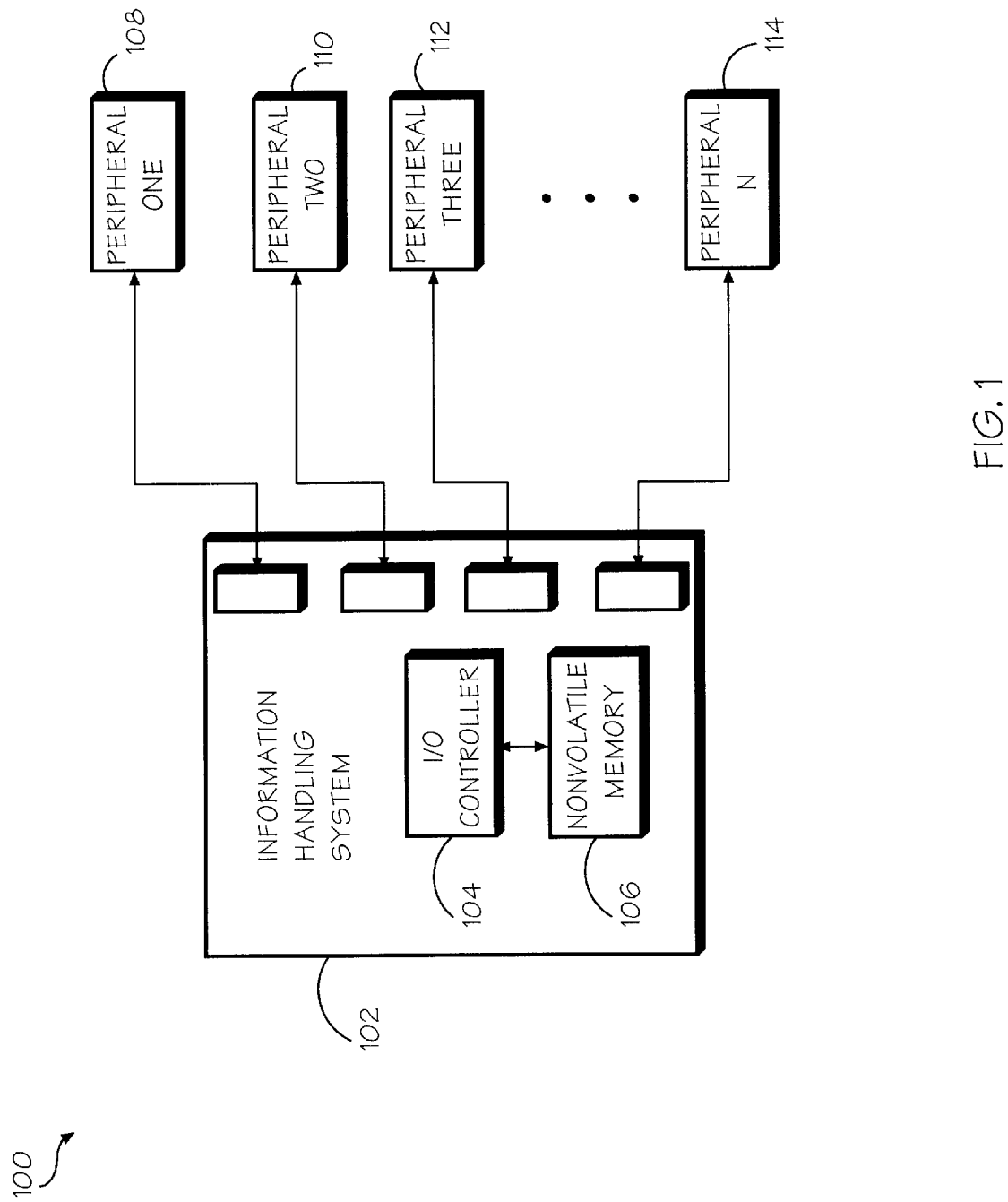
FIG. 1 is a block diagram depicting an exemplary embodiment of the present invention wherein an I/O controller of an information handling system utilizes a nonvolatile storage area containing an ordered peripheral list (OPL) to retain peripheral ordering.

Referring now to FIG. 1, an exemplary embodiment 100 of the present invention is shown wherein an I/O controller of an information handling system utilizes a non-volatile storage area containing an ordered peripheral list (OPL) to retain peripheral ordering. An information handling system 102 may include a desktop computer, internet appliance, digital information appliance, personal digital assistant, and the like without departing from the spirit and scope of the present invention. The information handling system 102 may include an I/O interface controller 104. The I/O interface controller 104 may have access to nonvolatile memory 106, such as nonvolatile random access memory (NVRAM). It may be preferable to configure the I/O interface controller 104 to include the nonvolatile memory as a part of the I/O interface controller 104 itself, the nonvolatile memory 106 suitable for storing an ordered peripheral list (OPL). The ordered peripheral list (OPL) may be utilized for establishing a preferred order of peripherals, such as the peripherals 108, 110, 112 and 114 coupled to the information handling system. In this way, the present invention takes the responsibility of assigning ID's for peripherals away from the user, thereby allowing the user to add and remove peripherals without having to worry about the specific ID being used. Specifically, the user may add and remove peripherals without worrying about changing the placement of the system drive and/or boot drive, thus insuring that these drives are available during a boot of the information handling system to supply files needed during initialization.

Figure 2:
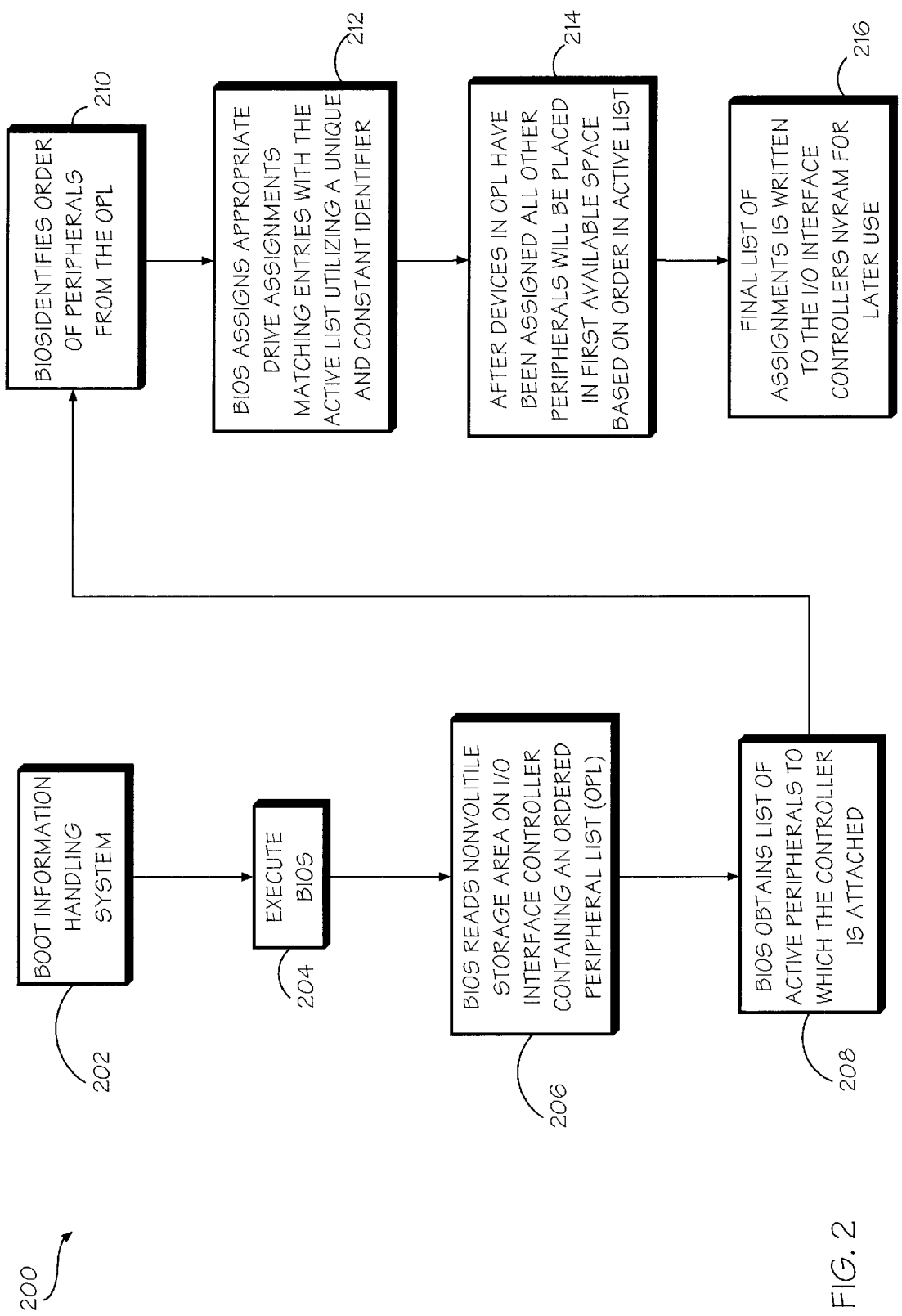
FIG. 2 is a flow diagram illustrating an exemplary method of the present invention wherein an ordered peripheral list is utilized by an information handling system to restore peripheral ordering.

Referring now to FIG. 2, an exemplary embodiment 200 of the present invention is shown wherein an ordered peripheral list is utilized by an information handling system to restore peripheral ordering. A host system may initiate a boot process 202 and execute a basic input/output system (BIOS) 204. Typically, the BIOS is a set of software routines that test hardware at startup, start the operating system and support the transfer of data among hardware devices. The BIOS reads a non-volatile storage area on an I/O interface controller containing an ordered peripheral list (OPL) 206. The BIOS may also obtain a list of active peripherals to which the controller is attached 208. Typically, the method for obtaining the active list of peripherals is specific to the I/O interface controller used. The BIOS identifies the order of the peripherals from the ordered peripheral list (OPL) 210 and assigns the appropriate drive assignments matching the entries with the active list by using a unique and constant identifier 212. After devices in the ordered peripheral list (OPL) have been assigned, other peripheral will be placed into the first available space based on their order in the active list 214. Additionally, the I/O interface controller may order the active list according to the ordered peripheral list (OPL) so that any host based driver using the active list will order peripherals based on the ordered peripheral list (OPL) without the driver's knowledge. The final list of assignment may then be written to the I/O interface controller's nonvolatile memory for later use 216.

Preferably, each peripheral is uniquely and constantly identified. For example, utilizing a fibre channel (FC) devices, the node name of a device is sufficient, in SCSI the bus, ID & logical unit number (LUN) combination is sufficient. Thus, the present invention may span a variety of I/O architectures where devices are uniquely and constantly identified.

Figure 3:
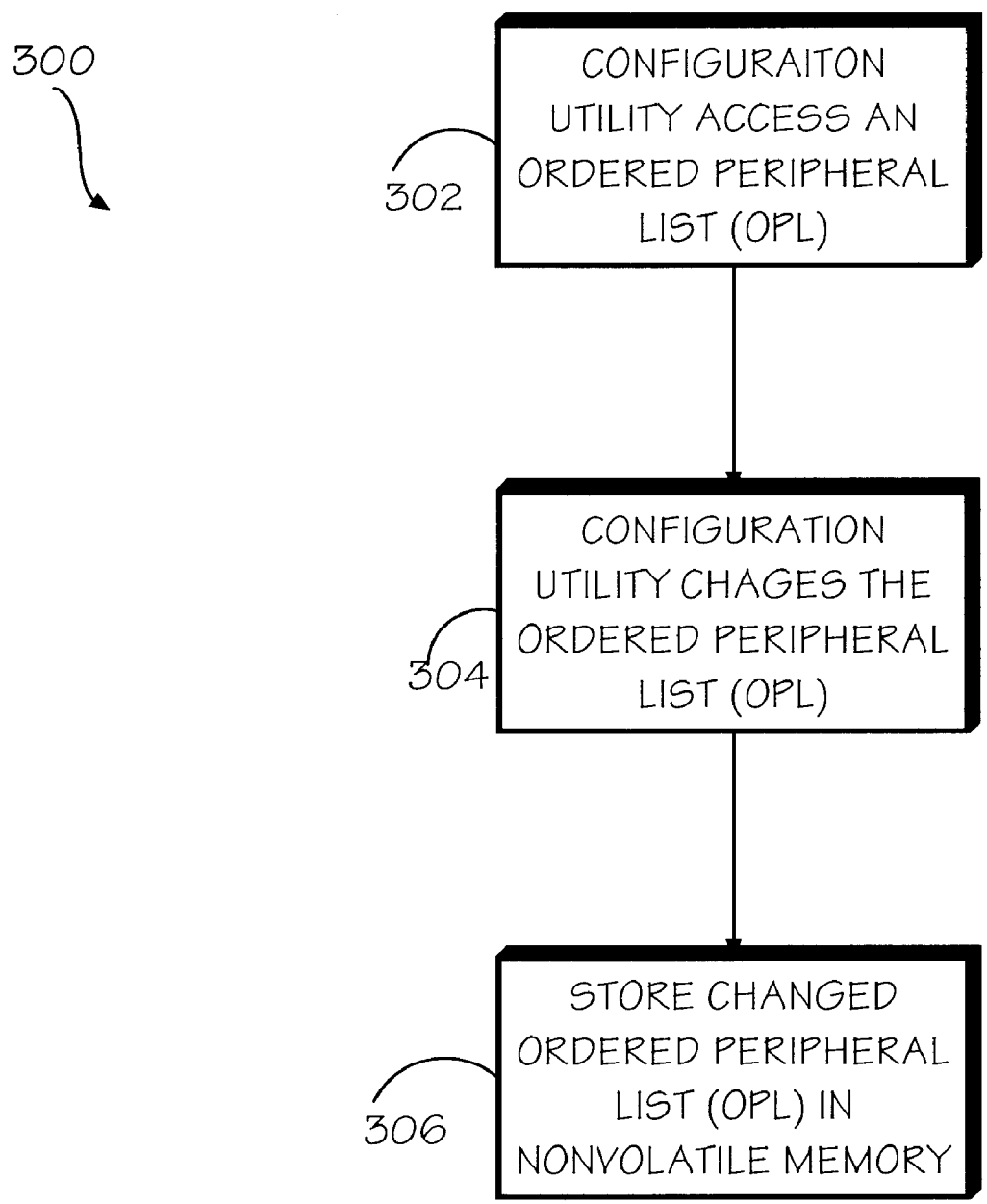
FIG. 3 is a flow diagram depicting an exemplary embodiment of the present invention wherein a configuration utility is provided for allowing a user to write an ordered peripheral list (OPL) accessible by an I/O controller.

It may also be preferable to provide a configuration utility for allowing a user to write an ordered peripheral list (OPL) to the nonvolatile memory. For example, as shown in FIG. 3, an exemplary embodiment 300 of the present invention is shown wherein a configuration utility is provided for allowing a user to write an ordered peripheral list (OPL) accessible by an I/O controller. A configuration utility accesses an ordered peripheral list (OPL) 302. The ordered peripheral list (OPL) may be stored in nonvolatile memory to retain the peripheral ordering for an information handling system. Thus, a user is not responsible for peripheral ordering and may add and remove peripherals without concern about the specific ID being used. In this way, the I/O interface controller may keep a boot drive and/or systems drive in a specific place in the list of available peripherals. It may be preferable to execute the configuration utility from within the BIOS itself.

The configuration utility may then change the ordered peripheral list (OPL) 304. For example, a peripheral may be added to the ordered peripheral list (OPL), a peripheral removed from the ordered peripheral list (OPL), the order of peripherals included on the ordered peripheral list (OPL) changed, and the like without departing from the spirit and scope of the present invention. The changed ordered peripheral list (OPL) may then be stored 306 in nonvolatile memory for later access by the I/O interface controller. Thus, the configuration utility may display a list of active peripherals and allow a user to modify their respective order.

Figure 4:
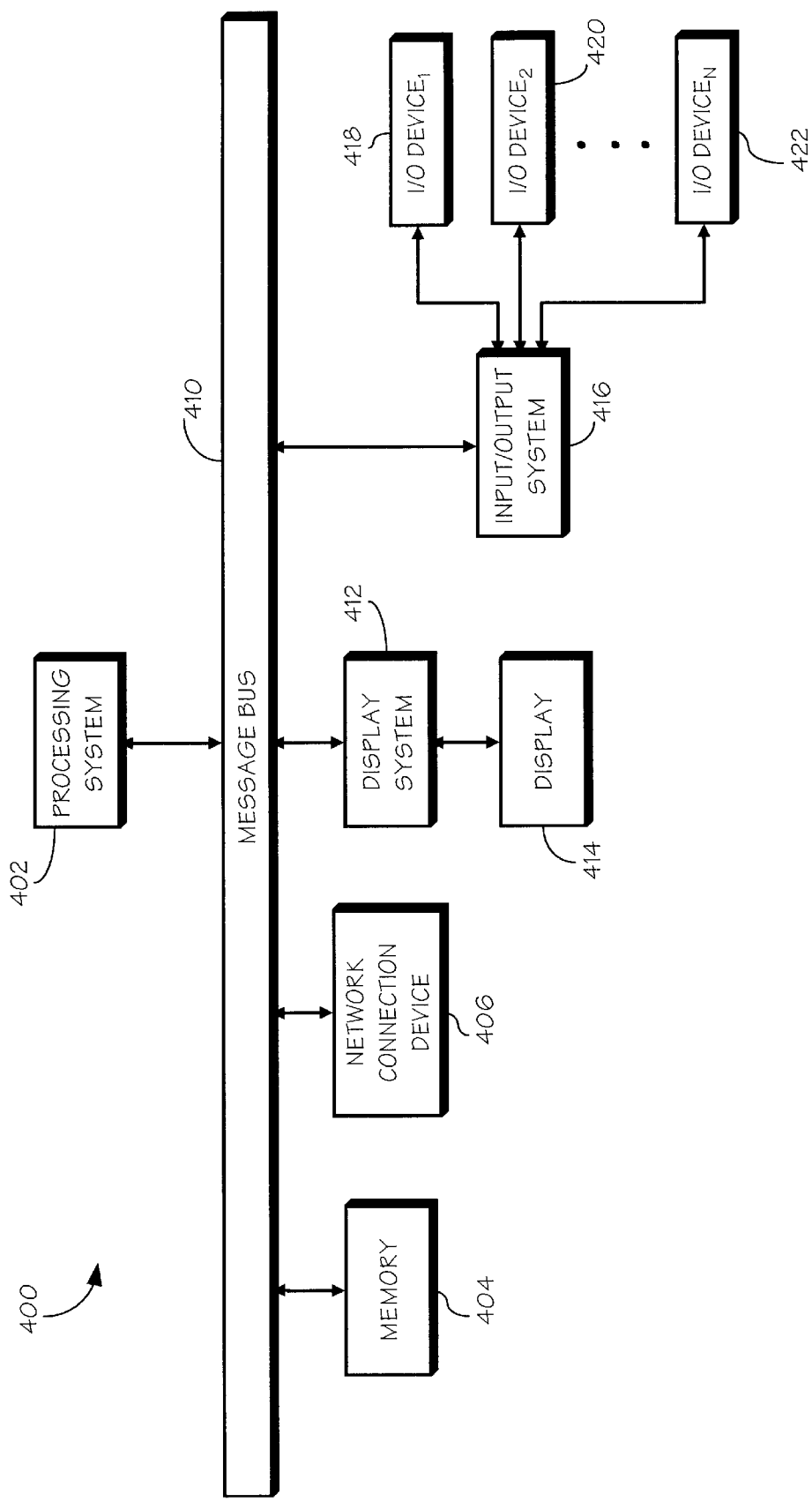
FIG. 4 is a block diagram illustrating an exemplary embodiment of the present invention wherein an information handling system operable to employ the present invention is shown.

Referring now to FIG. 4, a hardware system in accordance with the present invention is shown. The hardware system shown in FIG. 4 is generally representative of the hardware architecture of an information handling system of the present invention. A controller, for example, a processing system 402, controls the information handling system 400. The processing system 402 includes a central processing unit such as a microprocessor or microcontroller for executing programs, performing data manipulations and controlling the tasks of the information handling system 400. Communication with the processing system 402 may be implemented through a system bus 410 for transferring information among the components of the information handling system 400. The system bus 410 may include a data channel for facilitating information transfer between storage and other peripheral components of the information handling system 400. The system bus 410 further provides the set of signals required for communication with processing system 402 including a data bus, address bus, and control bus. The system bus 410 may comprise any state of the art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), EEE 696/S-600, and so on. Furthermore, the system bus 410 may be compliant with any promulgated industry standard. For example, the system bus 410 may be designed in compliance with any of the following bus architectures: Industry Standard Architecture (ISA), Extended Industry Standard Architecture (EISA), Micro Channel Architecture, Peripheral Component Interconnect (PCI), Universal Serial Bus (USB), Access bus, EEE P6394, Apple Desktop Bus (ADB), Concentration Highway Interface (CHI), Fire Wire, Geo Port, or Small Computer Systems Interface (SCSI), for example.

Additionally, the information handling system 400 includes a memory 404. In one embodiment, memory 404 is provided on SIMMs (Single In-line Memory Modules), while in another embodiment, memory 404 is provided on DIMMs (Dual In-line Memory Modules), each of which plugs into suitable sockets provided on a motherboard holding many of the other components shown in FIG. 4. Memory 404 includes standard DRAM (Dynamic Random-Access Memory), EDO (Extended Data Out) DRAM, SDRAM (Synchronous DRAM), or other suitable memory technology. Memory 404 may also include auxiliary memory to provide storage of instructions and data that are loaded into the memory 404 before execution. Auxiliary memory may include semiconductor based memory such as read-only memory (ROM), programmable read-only memory (PROM) erasable programmable read-only memory (EPROM), electrically erasable read-only memory (EEPROM), or flash memory (block oriented memory similar to EEPROM).

The information handling system 400 further includes a network connection device 406. The network connection device 406 communicates between the information handling system 400 and a remote device, such as external devices, networks, information sources, or host systems that administer a plurality of information handling systems. For example, host systems such as a server or information handling system, may run software controlling the information handling system, serve as storage for an information handling system, or coordinate software running separately on each information handling system. The network connection device 406 may provide or receive analog, digital, or radio frequency data. The network connection device 406 preferably implements industry promulgated architecture standards, including Recommended Standard 232 (RS-232) promulgated by the Electrical Industries Association, Infrared Data Association (IrDA) standards, Ethernet EEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, 802.66 for wireless networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/JPPP), Universal Serial Bus (USB), and so on. For example, the network connection device 406 may comprise a network adapter, a serial port, parallel port, printer adapter, modem, universal asynchronous receiver-transmitter (UART) port, and the like, or use various wireless technologies or links such as an infrared port, radio-frequency (RF) communications adapter, infrared transducers, or RF modem.

The information handling system 400 further includes a display system 412 for connecting to a display device 414. The display system 412 may comprise a video display adapter having all of the components for driving the display device, including video random access memory (VRAM), buffer, and graphics engine as desired. The display device 414 may comprise a liquid-crystal display (LCD), or may comprise alternative type of display technologies, such as a light-emitting diode (LED) display, gas or plasma display, or employ flat-screen technology.

An information handling system 400 may further include an input/output (I/O) system 416 for connecting to one or more I/O devices 418, 420 up to N number of I/O devices 422. Input/output system 416 may comprise one or more controllers or adapters for providing interface functions between one or more of I/O devices 418–422. For example, input/output system 416 may comprise a serial port, parallel port, network adapter, printer adapter, radio-frequency (RF) communications adapter, universal asynchronous receiver-transmitter (UART) port, and the like, for interfacing between corresponding I/O devices such as a mouse, joystick, trackball, trackpad, trackstick, infrared transducers, printer, modem, RF modem, bar code reader, charge-coupled device (CCD) reader, scanner, compact disc (CD), compact disc read-only memory (CD-ROM), digital versatile disc (DVD), video capture device, touch screen, stylus, electroacoustic transducer, microphone, speaker, and the like. It should be appreciated that modification or reconfiguration of the information handling system 400 of FIG. 4 by one having ordinary skill in the art would not depart from the scope or the spirit of the present invention.

Although the invention has been described with a certain degree of particularity, it should be recognized that elements thereof may be altered by persons skilled in the art without departing from the spirit and scope of the invention. One of the embodiments of the invention can be implemented as sets of instructions resident in the memory 404 of one or more information handling systems configured generally as described in FIG. 4. Until required by the information handling system, the set of instructions may be stored in another readable memory device, for example in a hard disk drive or in a removable memory such as an optical disk for utilization in a CD-ROM drive, a floppy disk for utilization in a floppy disk drive, a floppy/optical disk for utilization in a floppy/optical drive, or a personal computer memory card for utilization in a personal computer card slot. Further, the set of instructions can be stored in the memory of an information handling system and transmitted over a local area network or a wide area network, such as the Internet, when desired by the user. Additionally, the instructions may be transmitted over a network in the form of an applet that is interpreted or compiled after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

In exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order, or hierarchy of steps in the method can be rearranged while remaining within the scope of the present invention. The attached method claims present elements of the various steps in a sample order, and are not meant to be limited to the specific order or hierarchy presented.

It is believed that the method and system for peripheral ordering of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method for retaining peripheral ordering in an information handling system, comprising:

reading an ordered peripheral list (OPL) from a nonvolatile memory;

obtaining a list of active peripherals attached to an I/O interface controller;

identifying an order of peripherals from the ordered peripheral list (OPL); and assigning assignments to the active peripherals attached to the I/O interface controller corresponding to the ordered peripheral list (OPL), wherein when an active peripheral attached to the I/O interface controller is not included on the ordered peripheral list (OPL), assigning the active peripheral not included on the ordered peripheral list (OPL) to a first available space based on an order of the active list.

2. A method for retaining peripheral ordering in an information handling system, comprising:

reading an ordered peripheral list (OPL) from a nonvolatile memory;

obtaining a list of active peripherals attached to an I/O interface controller;

identifying an order of peripherals from the ordered peripheral list (OPL); and assigning assignments to the active peripherals attached to the I/O interface controller corresponding to the ordered peripheral list (OPL), wherein each peripheral is at least one of uniquely and constantly identified, wherein when a fibre channel (FC) device is used a node name of a device is used as an identifier, and wherein when a small computer system interface (SCSI) device is used, a bus, ID and logical unit number (LUN) are used as an identifier.

3. A device suitable for retaining peripheral ordering, comprising:

an I/O interface controller suitable for controlling an I/O interface; and a nonvolatile memory including an ordered peripheral list, wherein the ordered peripheral list is suitable for supplying an order of peripherals to an I/O interface controller such that active peripherals that are identified are capable of receiving an assignment corresponding to the ordered peripheral list (OPL), thus allowing at least one of a system drive and boot drive to remain in a specific place in the list of active peripherals upon rebooting, wherein when an active peripheral attached to the I/O interface controller is not included on the ordered peripheral list (OPL), assigning the active peripheral not included on the ordered peripheral list (OPL) to a first available space based on an order of the active list.

4. A device suitable for retaining peripheral ordering, comprising:

an I/O interface controller suitable for controlling an I/O interface; and a nonvolatile memory including an ordered peripheral list, wherein the ordered peripheral list is suitable for supplying an order of peripherals to an I/O interface controller such that active peripherals that are identified are capable of receiving an assignment corresponding to the ordered peripheral list (OPL), thus allowing at least one of a system drive and boot drive to remain in a specific place in the list of active peripherals upon rebooting, wherein each peripheral is at least one of uniquely and constantly identified, wherein when a fibre channel (FC) device is used a node name of a device is used as an identifier, and wherein when a small computer system interface (SCSI) device is used, a bus, ID and logical unit number (LUN) are used as an identifier.

5. A method for retaining peripheral ordering in an information handling system, comprising:

booting an information handling system;

executing a basic input/output system (BIOS) included on the information handling system;

reading an ordered peripheral list (OPL) stored in a nonvolatile memory by the BIOS;

obtaining a list of active peripherals coupled to an I/O interface controller;

identifying an order of peripherals wherein the list of active peripherals is compared to the ordered peripheral list (OPL);

assigning assignments to the active peripherals corresponding to the ordered peripheral list (OPL); and placing peripherals included on the list of active peripherals but not included in the ordered peripheral list (OPL) in a first available space based on an order in the list of active peripherals.

* * * * *